United States Patent [19]

Fan

[11] Patent Number: 5,602,908
[45] Date of Patent: Feb. 11, 1997

[54] CALLING PARTY IDENTIFYING APPARATUS AND METHOD THEREFOR

[76] Inventor: Yuan-Neng Fan, 15045 N. 49 St., Scottsdale, Ariz. 85254

[21] Appl. No.: 444,823

[22] Filed: May 18, 1995

[51] Int. Cl.⁶ .................................................. H04M 15/06
[52] U.S. Cl. .......................... 379/199; 379/142; 379/374; 379/376
[58] Field of Search .................................... 379/188, 199, 379/142, 127, 201, 373, 374, 375, 376, 57, 354, 216

[56] References Cited

U.S. PATENT DOCUMENTS

| | | | |
|---|---|---|---|
| 4,266,098 | 5/1981 | Novak | 379/142 |
| 4,277,649 | 7/1981 | Sheinbein | 379/201 |
| 4,924,496 | 5/1990 | Figa et al. | 379/142 |
| 5,127,049 | 6/1992 | Sabo | 379/199 |
| 5,157,712 | 10/1992 | Wallen, Jr. | 379/199 |
| 5,265,145 | 11/1993 | Lim | 379/142 |
| 5,329,578 | 7/1994 | Brennan et al. | 379/201 |

*Primary Examiner*—Ahmad F. Matar
*Attorney, Agent, or Firm*—Harry M. Weiss; Jeffrey D. Moy; Harry M. Weiss & Associates, P.C.

[57] ABSTRACT

A calling party identifying apparatus electrically connected to an exchange system which can provide the calling number and the registered name of the phone set or the like includes a receiver, a microprocessor, a memory, an LCD, a key pad, a plurality of lights, and a speaker. The memory has a database installed therein including a plurality of potential callers' information each of which includes a specific caller's name, the calling number of the caller, the preference degree thereof, and the preferred hours for the caller to call. The apparatus is allowed to display the caller's name on the LCD instead of displaying the registered name of the calling device. When any call comes in, the apparatus will check the database and display the caller's name, the calling number thereof, and the preference degree thereof. In the meantime, the lights and the speaker will visually and audibly illustrate the preference degree of the call by a preset light pattern and audible pattern, thus helping the user to determine whether to receive the call or not. If the call is not coming in during the preferred hours, the call is automatically cut off by the microprocessor. A key pad allows the user to make a call by dialing one or more characters instead of the whole number. The microprocessor is also capable of calling a pager right after a high preference degree call is not answered by any person so an intended recipient will not miss the high preference degree call.

15 Claims, 2 Drawing Sheets

CALLING PARTY IDENTIFYING APPARATUS AND METHOD THEREFOR

BACKGROUND OF THE INVENTION

1. Field of the Invention

This invention relates to a calling party identifying apparatus (Caller ID) and method therefor, especially for one which identifies the calling party and displays the related information including the caller's name (not necessarily the registered name for the number), the telephone number of the caller, and the preference degree of the caller, thus screening the call before the user receives the call. The calling party identifying apparatus is capable of calling a pager right after a high preference degree call is not answered by the called party so the called party will not miss important calls. Moreover, the calling party identifying apparatus can cut off any call ringing if the latter is not coming in during preferred hours for the corresponding caller to call. The preferred hours for different callers have already been preset in a memory of the calling party identifying apparatus. The calling party identification apparatus is allowed to be installed on any telephone set or any telecommunication device linked to a telephone line for screening the incoming information therefrom and preventing any unwelcome or strange information to come in. The calling party identification apparatus also allows a user to make a call merely by dialing one or more characters instead of dialing the whole number.

2. Description of the Prior Art

In the conventional telephone service, a called party is informed of a calling party by a sequence of ringing sounds from a telephone. The called party has to pick up the phone and listen to the calling party to identify the calling party. However, the called party might not want to talk with the calling party if he knows first "who" is calling. It is known that some exchange systems of the telephone company can send identification information including the telephone number of the calling party to any called party. Currently, there are Caller ID devices which work with the above mentioned exchange system to display the caller's telephone number as well as other information related to the incoming call. For example, see U.S. Pat. No. 4,582,956 issued on Apr. 15, 1986 to Carolyn A. Doughty. However, with these types of devices, the customer must depend on the telephone company for transmitting the desired information pertaining to the incoming call.

Another exchange system can provide identification information including the telephone number and the name of the person registered for that number. Therefore, with this exchange system, the called party can obtain the calling number and the registered name for that number when the call is coming in. However, once again a party must depend on the telephone company for transmitting the desired information pertaining to the call. Furthermore, the calling party is not necessarily the person registered for that number. The calling party may be merely a family member or a company staff of the registered person. There are Caller ID devices which include a directory of telephone numbers and parties associated with those numbers. The circuitry of these types of Caller ID devices detect an incoming call and compare the number with numbers in the directory for identifying the calling party. For example, see U.S. Pat. No. 4,924,496 issued on May 8, 1990 to Romek Figa et al. However, these types of systems do not let a user prioritize an incoming call nor do these system provide a means to contact a called party if the telephone call is a high priority call and the called party has not answered the call. Therefore, it is requisite to provide a calling party identifying apparatus capable of receiving the identification information and informing the called party the exact caller's name, the telephone number of the caller, and the preference degree of the caller, thus, the called party can respond by receiving or not receiving the phone call. The calling party identification apparatus can also contact the called party if a high priority call is made and the called party has not answered the call. Furthermore, the calling party identification apparatus can disable the ringing of the phone call if the calling party has called out of the preferred hours for him to call.

SUMMARY OF THE INVENTION

It is an object of the present invention to provide a calling party identifying apparatus comprising a microprocessor, an LCD display, a first preference indicating means, a second preference indicating means, a key pad, a memory, a ringing detector, a code receiver, and a dual tone multifrequency (DTMF) generator. The memory is programmably stored with personal information of different potential calling parties. Each personal information includes a specific person's name, the telephone number thereof, the preference degree of the person, and the preferred hours for the person to call. The calling party identifying apparatus can acquire the identification information of the calling party such as the telephone number from the telephone lines and display the caller's name, the telephone number of the caller, and the preference degree of the caller, thereby helping the called party to determine whether to receive the call or not.

It is another object of the present invention to provide a calling party identifying apparatus which can respond to any call and cut off the ringing automatically if the call is made out of the preferred hours for the caller to call.

It is another object of the present invention to provide a calling party identifying apparatus which allows the user to make a phone call by dialing one or more characters representing a name of a person or a company instead of dialing the whole telephone number.

It is another object of the present invention to provide a calling party identifying apparatus which can record all the incoming telephone numbers and the related calling times when the user is out and allow the user to review all the telephone information including the calling time, the caller's name, the telephone number, and the preference degree of the caller.

It is still another object of the present invention to provide a calling party identifying apparatus which is operable to call a pager right after an important call comes in but is not answered by any person, so the intended recipient will not miss any important calls.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
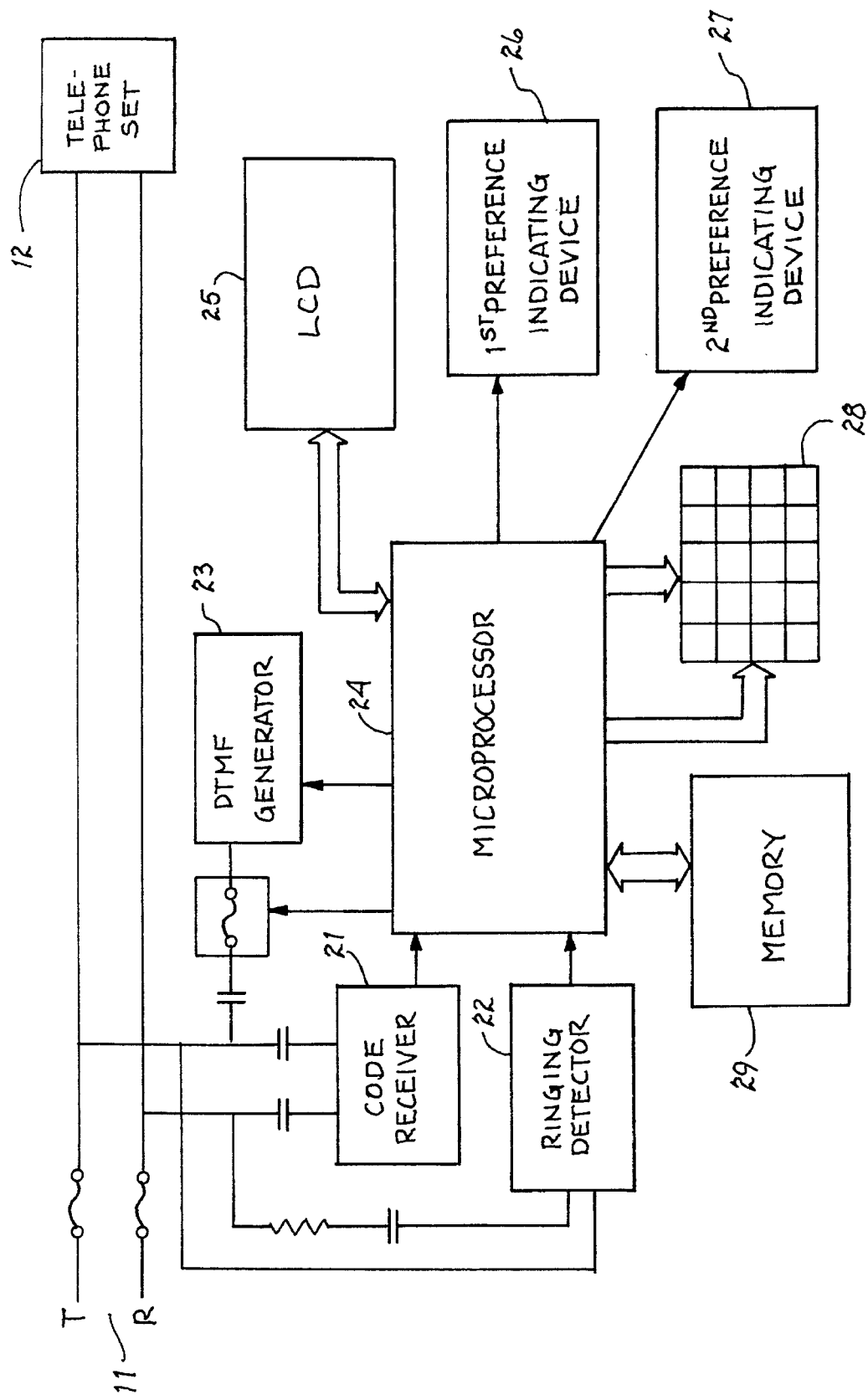
FIG. 1 is a block diagram in accordance with the present invention.

Now referring to the drawings and initially to FIG. 1, a calling party identifying apparatus in accordance with the present invention is connected in parallel with a pair of external telephone lines 11 and a telephone set 12 (or any other telecommunication device such as a fax machine, an E mail or the like) for picking up the identification information of a calling party transmitted by the telephone lines 11. The additional presence of the identifying apparatus does not affect the standard function of the telephone set 12. The identifying apparatus comprises a microprocessor 24, an LCD display 25, a first preference indicating means 26, a second preference indicating means 27, a key pad 28, a memory 29, a ringing detector 22, a code receiver 21, and a dual tone multifrequency generator 23. The memory is a programmable memory such as an EEPROM. The code receiver 21 and the ringing detector 22 have their input terminals respectively connected to the external telephone lines 11 in parallel for detecting the transmitted signal from the lines 11 and further forward the detected signal to the microprocessor 24. The dual tone multifrequency generator 23 is actuated by the microprocessor 24, generating dual tone dialing signals and feeding the dialing signals to the external lines 11 for the owner to dial.

The code receiver 21 is electrically connected between the external lines 11 and the microprocessor 24 for receiving the calling party information, converting the information to digital signals and feeding the digital signals to the microprocessor 24. The LCD 25 is electrically connected to the microprocessor 24 for illustrating the related information such as the telephone number and the name of the calling party or even more as will be described in greater detail. The memory 29 is allowed to be programmably stored with different personal information each of which including a personal name, the preference degree of the person, the preferred hours for the person to call, and the telephone number of the person. The microprocessor 24 responds to the telephone number of the calling party and searches the memory 29 to obtain the related personal information about the calling party. The first indicating means 26 includes a plurality of lights each of which has a color for representing a specific one of the preference degrees. The second preference indicating means 27 including a transistor and a speaker for generating different sound patterns to respectively represent different preference degrees for different calling parties.

The memory 29 has a database installed therein including a plurality of potential callers' information each of which includes a specific caller's name, the calling number of the caller, the preference degree thereof, and the preferred hours for the caller to call. The identification information of different calling parties is automatically acquired from the external lines 11 and stored in the memory 29. Basically, the identification information is the telephone number of the calling party. For some exchange systems, the identification information includes the telephone number and the registered person's name thereof. The preference degree and the preferred hours are set by the user. The telephone numbers of the potential calling parties together with the related names, the preference degree and the preferred hours are inputted by the user from the key pad 28 and are used to compare with the identification information of any dynamic calling party, thus when a telephone number of a calling party is matched with any one of the telephone numbers in the memory 29, the microprocessor 24 will actuate the LCD 25 to display the related information of the calling party including the telephone number, the name, and the preference degree. Actually, the microprocessor 24 can also cut off the ringing of the telephone, if the present call is not received during the preferred hours for the caller to call. However, if none of the telephone numbers of the potential calling parties matches with the telephone number of the calling party, the telephone number of the calling party is automatically recorded in the memory 29, thus the calling party is converted to be one of the potential calling parties. However, for those exchange systems which can send out the identification information including the telephone number and the registered person's name, the registered name and the telephone number will be recorded in the memory 29 and will be displayed on the LCD 25 if they are not originally stored in the memory 29. The user can add the relating name, the preference degree, and the preferred hours of the calling party into the memory 29 together with the telephone number thereof constituting a personal database for the calling party. It is noted that the called party can variably predetermine a priority to be given to any entirely new calling party to decide whether or not to receive such calls. The telephone numbers of the potential calling parties can also be used for automatic dialing by manually operating the key pad 28 with at least one representative character of a person's name which is already stored in the memory 29 with his corresponding telephone number, thus permitting the user to depress at least a character instead of dialing the whole telephone number. The character(s) is/are not limited to the initial of the caller's name but whatever can easily remind the user.

When in operation, the external lines 11 transmit the identification information of the calling party, the code receiver 21 receives the telephone number contained in the identification information and forwards the telephone number to the microprocessor 24. The microprocessor 24 responds to the received telephone number and searches the memory 29 for the same number and actuates the LCD 25 to show the caller's name and the corresponding data base including the telephone number and the preference degree of the caller. In the mean time, the first preference indicating means 26 and the second preference indicating means 27 respectively illustrate the preference degree with a light pattern and a sound pattern. As mentioned previously, if the caller does not call during preferred hours for him to call, the ringing is automatically cut off.

Figure 2:
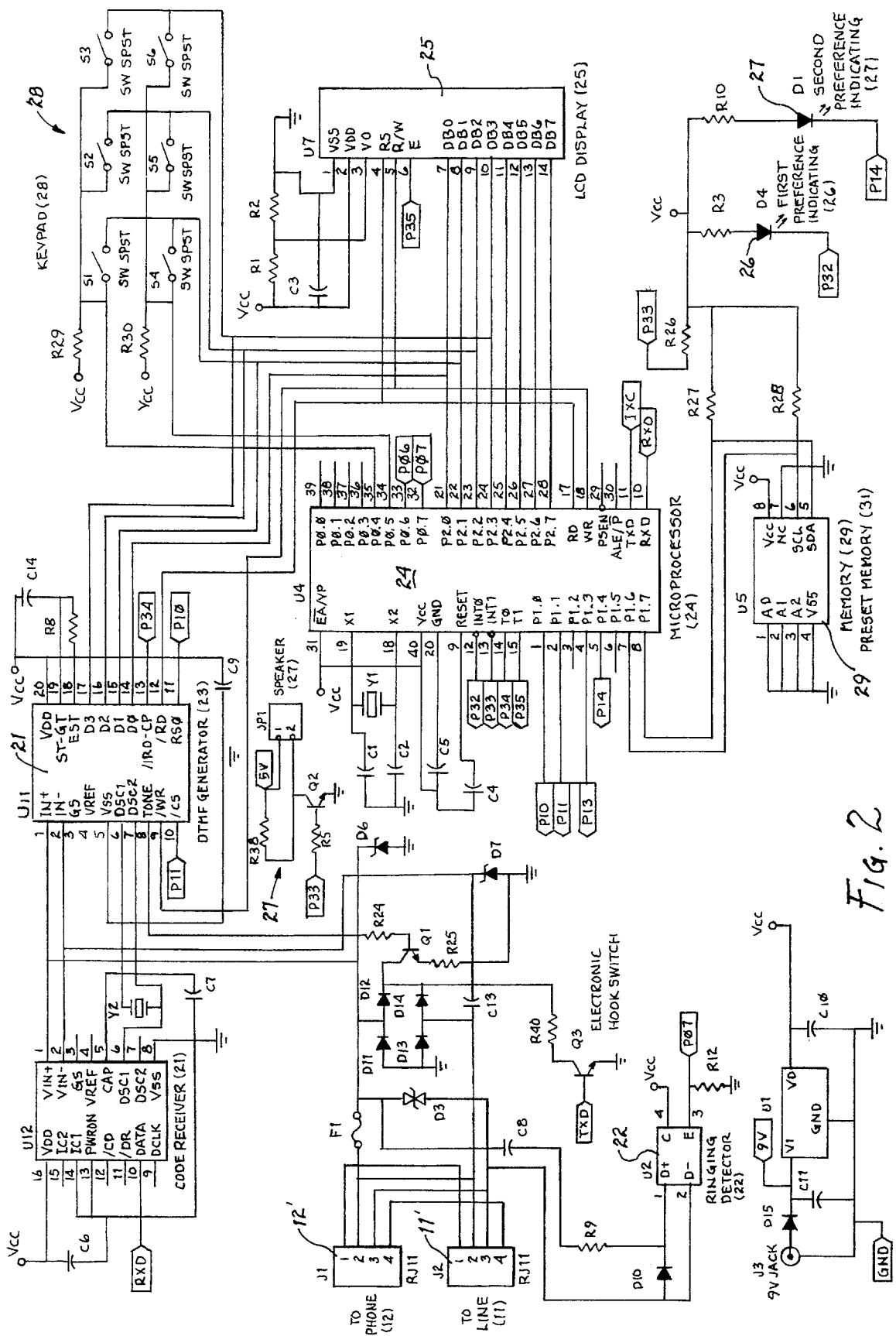
FIG. 2 is a circuit diagram of the present invention.

Referring to FIG. 2, the detailed circuit of the present invention comprises a first connector 11' for connecting with the external telephone lines 11 and a second connector 12' for connecting with the telephone set 12. The ringing detector 22 is composed of a photo-coupler. The code receiver 21 and the dual tone multifrequency generator 23 are arranged at the middle portion of the figure. The key pad 28 comprising a plurality of key switches is arranged at the top right side of the figure. The microprocessor 24, the first preference indicating means 26, the second preference indicating means 27, the LCD 25, and the memory 29 are arranged at the bottom right side of the figure. The first preference indicating means 26 includes at least two LEDs, one is a green light for illustrating that the call is important and another is a red light for illustrating that the call is not important. Of course, the number of LEDs is not limited to two and the light pattern for important levels is not limited to the one mentioned. A power supply of the whole circuit is arranged at the bottom left side of the figure. The calling party identifying apparatus is allowed to be installed inside or outside of a telephone set.

The calling party identification apparatus as mentioned above is also allowed to be installed with any telecommunication device such as a fax machine, a computer or the like which is linked to a telephone line for screening the incoming information therefrom and automatically preventing any unwelcome or strange information to come in. Normally, when there is no call coming in, the identification apparatus will function like a clock with the LCD 25 thereof showing the time thereon. It is noted that a timer (not shown) is included in the identifying apparatus for time counting. It is noted that the identifying apparatus can also record all the incoming telephone numbers and the related calling times when the user is out and allow the user to review all the telephone information including the calling time, the caller's name, the telephone number, and the preference degree of the caller. The light pattern of the identifying apparatus remains until another phone call comes in and changes the previous pattern for the previous call. For example, if the green light indicates an important call and the red light indicates an unimportant call, the green light and the red light both remain ON if an important call and an unimportant call come in during a time period when the user is out. When the user comes in and sees the green light and the red light both ON, he will notice that at least one important call came in while he was out. Therefore, he will review the recorded information and find out the important call. If only the red light remains ON, then the user can ignore the recorded information, thus saving his time. The identifying apparatus is also allowed to be loaded with an extra software subroutine in the microprocessor 24 for responding to a not-answered important call (i.e., a call having high preference degree not being answered by the user or any other persons) by automatically calling a pager carried by the user. The pager will respond to the call from the identifying apparatus and illustrate the caller's information including the name and the telephone number on the pager.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A calling party identifying apparatus comprising, in combination:

ring detector means coupled to a pair of external telephone lines for detecting a call from a calling party;

code receiver means coupled to said pair of external telephone lines for detecting identification information from said calling party via said external telephone lines;

microprocessor means coupled to said ring detector means and said code receiver means for responding to detection of said call and receiving identification information of said calling party from said code receiver means;

memory means coupled to said microprocessor means for programmably storing different personal information each of which includes a name of a person, preference degree of said person, preferred hours for said person to call, and telephone number of said person;

key pad means including a plurality of key switches coupled to said microprocessor for inputting personal information of a potential calling party;

LCD means coupled to said microprocessor means for displaying said personal information of said calling party after said microprocessor means receives said identification information of said calling party; and first preference indicating means, including a plurality of lights thereon, for representing said preference degree;

said microprocessor means responds to reception of said identification information of said calling party and searches for said telephone number of said calling party from said memory means and displays located personal information including the name of said calling party, preference degree of said calling party, and said telephone number of said calling party on said LCD means when said telephone number of said calling party is present in said memory means, otherwise said microprocessor means merely responds by displaying said telephone number on said LCD means.

2. A calling party identifying apparatus as claimed in claim 1 further comprising second preference indicating means including a transistor and a speaker for responding to said preference degree and emitting a corresponding sound pattern to illustrate the preference degree of said call.

3. A calling party identifying apparatus as claimed in claim 1 further comprising dual tone multifrequency generator means coupled to said external lines and said microprocessor means for sending out multifrequency signals representing a corresponding character for a corresponding telephone number already stored in said memory means so that a user can dial out by said character instead of said telephone number.

4. A calling party identifying apparatus as claimed in claim 1 wherein said ring detector means is a photo-coupler.

5. A calling party identifying apparatus as claimed in claim 1 wherein said memory means is a programmable memory.

6. A calling party identifying apparatus as claimed in claim 1 wherein said microprocessor means having means for cutting off ringing of a phone call if said call is received out of preferred hours.

7. A calling party identifying apparatus as claimed in claim 1 wherein said microprocessor means having means for calling a pager right after a high preference degree call is not answered by any person so an intended recipient will not miss said high preference degree call.

8. A calling party identifying apparatus comprising, in combination:

ring detector means coupled to a pair of external telephone lines for detecting a call from a calling party;

code receiver means coupled to said pair of external telephone lines for detecting identification information from said calling party via said external telephone lines;

microprocessor means coupled to said ring detector means and said code receiver means for responding to detection of said call and receiving identification information of said calling party from said code receiver means;

memory means coupled to said microprocessor means for programmably storing different personal information each of which includes a name of a person, preference degree of said person, preferred hours for said person to call, and telephone number of said person;

key pad means including a plurality of key switches coupled to said microprocessor means for inputting personal information of a potential calling party;

LCD means coupled to said microprocessor means for displaying said personal information of said calling party after said microprocessor means receives said identification information of said calling party;

said microprocessor means responds to said reception of said identification information of said calling party and searches for said telephone number from said calling party from said memory means and displays located personal information including the name of said calling party, preference degree of said calling party, and telephone number of said calling party on said LCD means when said telephone number of said calling party is present in said memory means, otherwise said microprocessor means merely responds by displaying the telephone number on said LCD means;

first preference indicating means, including a plurality of lights thereon, for representing said preference degree;

second preference indicating means including a transistor and a speaker for responding to said preference degree and emitting a corresponding sound pattern to illustrate the preference degree of said call; and dual tone multifrequency generator means coupled to said external lines and said microprocessor means for sending out multifrequency signals representing a corresponding character for a corresponding telephone number already stored in said memory means so that a user can dial out by said character instead of said telephone number; and said microprocessor means having means for calling a pager right after a high preference degree call is not answered by any person so an intended recipient would not miss said high preference degree call.

9. A method of providing a calling party identifying apparatus comprising the steps of:

providing ring detector means coupled to a pair of external telephone lines for detecting a call from a calling party;

providing code receiver means coupled to said pair of external telephone lines for detecting identification information from said calling party via said external telephone lines;

providing microprocessor means coupled to said ring detector means and said code receiver means for responding to detection of said call and receiving identification information of said calling party from said code receiver means;

providing memory means coupled to said microprocessor means for programmably storing different personal information each of which includes a name of a person, preference degree of said person, preferred hours for said person to call, and telephone number of said person;

providing key pad means including a plurality of key switches coupled to said microprocessor for inputting personal information of a potential calling party;

providing LCD means coupled to said microprocessor means for displaying said personal information of said calling party after said microprocessor means receives said identification information of said calling party; and providing first preference indicating means, including a plurality of lights thereon, for representing said preference degree;

said microprocessor means responds to reception of said identification information of said calling party and searches for said telephone number of said calling party from said memory means and displays located personal information including the name of said calling party, preference degree of said calling party, and telephone number of said calling party on said LCD means when said telephone number of said calling party is present in said memory means, otherwise said microprocessor means merely responds by displaying said telephone number on said LCD means.

10. The method of claim 9 further comprising the step of providing second preference indicating means including a transistor and a speaker for responding to said preference degree and emitting a corresponding sound pattern to illustrate the preference degree of said call.

11. The method of claim 9 further comprising the step of providing dual tone multifrequency generator means coupled to said external lines and said microprocessor means for sending out multifrequency signals representing a corresponding character for a corresponding telephone number already stored in said memory means so that a user can dial out by said character instead of said telephone number.

12. The method of claim 10 wherein said step of providing ring detector means further comprises the step of providing a photo-coupler.

13. The method of claim 9 wherein said step of providing memory means further comprises the step of providing a programmable memory.

14. The method of claim 9 wherein said step of providing microprocessor means further comprises the step of providing microprocessor means having means for cutting off ringing of a phone call if said phone call is received out of preferred hours.

15. The method of claim 9 wherein said step of providing microprocessor means further comprises the step of providing microprocessor means having means for calling a pager right after a high preference degree call is not answered by any person so an intended recipient will not miss said high preference degree call.

* * * * *